Sept. 10, 1929.  A. L. JAMIESON  1727,830
HEADLIGHT
Filed Aug. 16, 1927  2 Sheets-Sheet 1
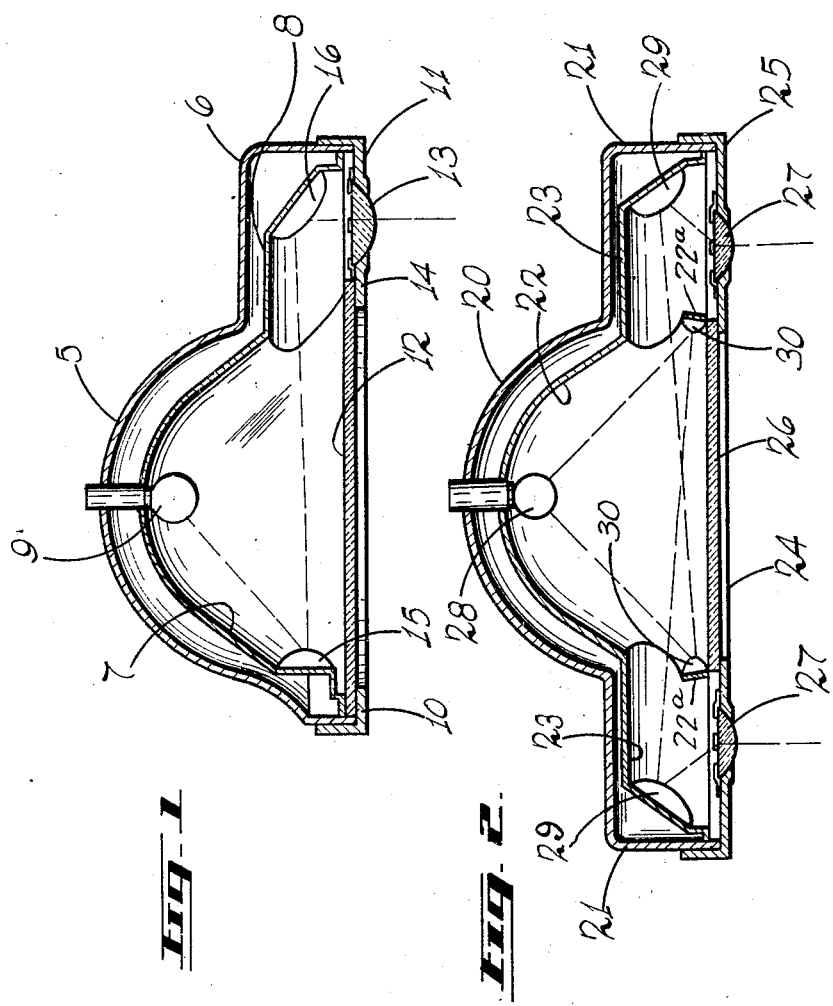
INVENTOR
Anna L. Jamieson
By Harold D. Penney,
HER ATTORNEY Sept. 10, 1929.  A. L. JAMIESON  1727,830
HEADLIGHT
Filed Aug. 16, 1927  2 Sheets-Sheet 2
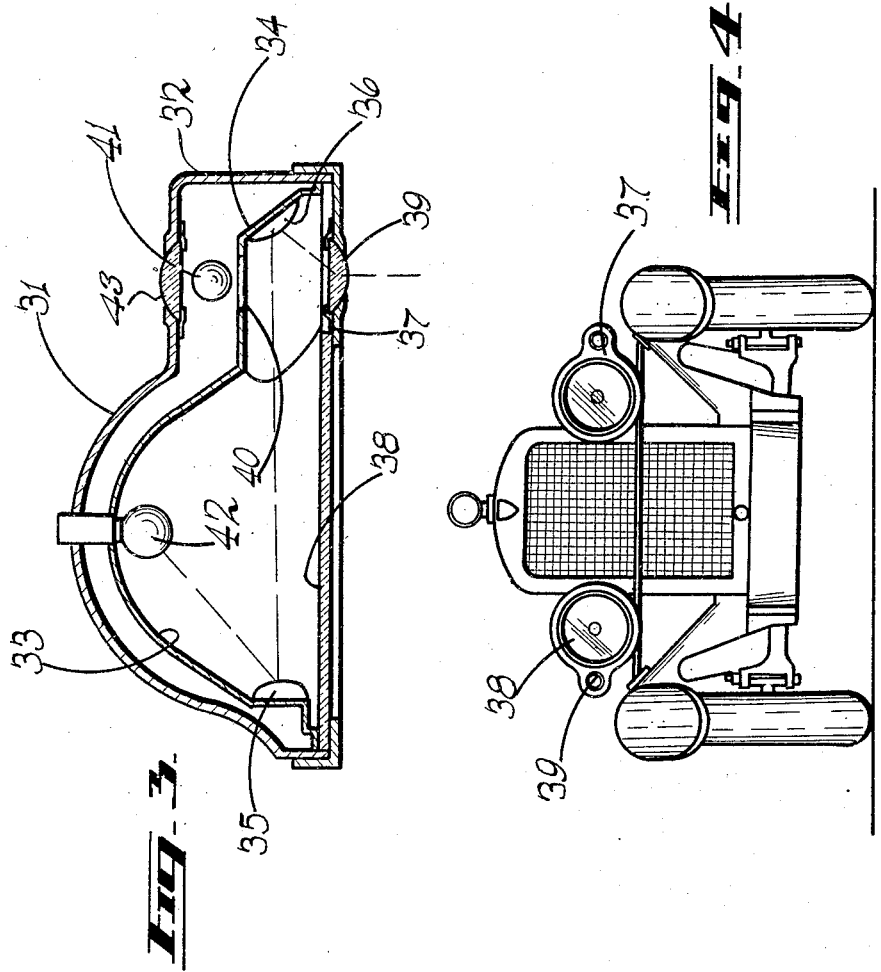
INVENTOR
Anna L. Jamieson
BY Harold D. Penney,
HER ATTORNEY Patented Sept. 10, 1929.

1,727,830

UNITED STATES PATENT OFFICE.

ANNA L. JAMIESON, OF OTTAWA, ONTARIO, CANADA.

HEADLIGHT.

Application filed August 16, 1927. Serial No. 213,374.

My present invention relates to improvements in headlights for motor vehicles and the like appertaining particularly to a compound lamp of the character described that is adapted to project an auxiliary beam in the direction of the main beam.

An object of the invention is to provide a headlight having associated with its main beam a secondary beam of light projected parallel with or in the direction of the main beam and created by the same light bulb.

A further object of the invention is the provision of a motor vehicle headlight having plural light beams directed forwardly whereby approaching traffic may be appraised of the relative position of the vehicle supporting the light if only one of the headlights is employed or illuminated by the selective size or coloring of the beams.

A further object of the invention is the provision of a vehicle headlight for projecting plural beams originating from a single light bulb wherein the auxiliary beam or beams are reflected from the main headlight casing into a supplemental chamber or chambers extending radially from the main casing to which they are built and with which communication is had to afford passage of the reflected rays, such rays being then deflected forwardly through a glass lens in the supplemental chamber that is preferably colored for signal purposes.

A further object of the invention is the provision of a compound beam headlight as described, illuminated by a single bulb but carrying a second bulb for projecting the secondary beam only, as for a parking light.

A still further object is the provision of an automobile headlight of the character described whose principal use will be to signal to approaching traffic, when only one of the pair of headlights is illuminated, by means of the color system or different sizes or positions of lens, on which side of the vehicle the single light is mounted and that is characterized by structural simplicity, relatively few parts and low cost of production, being thereby rendered commercially desirable.

To the accomplishment of these and related objects, my invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure, wherein like characters indicate like parts throughout the several views.

In the drawings:—

Figure 1 is a section through a lamp casing illustrating the principle of mounting a secondary lens alongside of the main lens, both illuminated by the one bulb;

Figure 2 is a similar section of lamp casing embodying a secondary lens on each side of the main lens, as for use with colored lights.

Figure 3 is a section of another form, similar to that illustrated in Figure 1 but including a second light bulb positioned behind the secondary lens bulb, thereby adapting it for use for parking purposes;

Figure 4 is a front view of a motor vehicle equipped with my improved headlights.

The rapidly increasing number of motor cars that are encountered on the highways, carrying but a single illuminated light that may be on either the right or left side of the vehicle but of whose location the approaching drivers are ignorant, has created perhaps the greatest menace with which motorists have to contend. Because the operator sometimes is unaware that one of his headlights is not functioning and so few drivers are inclined to carry a reserve supply of such fragile equipment as electric light bulbs, the bulb is almost invariably damaged and the light goes out before any thought is given to correction or replacement. Consequently almost every driver is liable at some time or other to be guilty of the offense of operating his vehicle while equipped with but one illuminated headlight.

To overcome the danger that this condition creates for approaching vehicles, I have devised this means of indicating on which side of the one-light vehicle, the single illuminated lamp is mounted, by associating therewith a secondary beam of light, cast by the usual main bulb, whose relative position to the main beam of light designates the side of the vehicle on which the illuminated lamp is mounted.

A simple form of this light has been illustrated in Figure 1 and will be seen to comprise a casing 5 having the extension 6 continuing radially therefrom at one side. Positioned therein is a reflector 7, conventional in form, except that a portion 8 reaches into the extension 6. A bulb 9 is mounted in the usual position in the central part of the reflector 7 and is illuminated from a suitable source such as a magneto, storage battery or the like, not shown.

In the glass carrying frame 10 adapted for reception by the casing 5, there is obviously a part 11 configurated to overlie and enclose the extension 6 of the casing, and in the main portion of the frame 10 and the part 11 are separate glasses or lenses 12 and 13 respectively, the former assuming the usual form and shape while the latter, though preferably circular and spaced by an intersecting frame piece 14, may be square, oblong or oval as found desirable in practice.

The projection of a beam of light through the small lens 13 is accomplished by means of a deflector 15 mounted on the reflector 7 immediately opposite the extension 6 in the casing and a second deflector 16 mounted at an angle in the portion 8 of the reflector 7, that reaches into the extension 6 so that a small part of the rays of light shed by the bulb 9 are thus projected through the small glass 13 by means of these cooperating deflectors 15 and 16.

A compound form of this same design is seen in Figure 2, here however the casing 20 has an extension 21 extending from each side, diametrically opposite one another. Similarly, the main reflector 22 has opposite wings 23 on each side to enter these extensions 21 and the glass carrying frame 24 is provided with a pair of extra side parts 25 to receive in addition to the main glass 26, a pair of smaller glasses 27. As in the former instance, but a single bulb 28 is employed to illuminate all three glasses, this being accomplished in the present form by providing the usual deflectors 29 in the farthest corner of the auxiliary wings 23 and a pair of oppositely disposed primary deflectors 30 mounted, immediately adjacent the margin of the main glass 26, on fins 22ᵃ bent up from and supported by the main reflector 22. The light from the bulb 28 is thus reflected by these deflectors 30, back of the opposite deflector 30 onto the wing deflectors 29, and thence through the glasses 27.

A further modification of Figure 1 and that may be considered the preferred form of the invention is shown in Figure 3. In this embodiment the casing 31 assumes the general form of the casing 5, shown in Figure 1, with an extension 32 corresponding to the extension 6; the reflector 33 with the arm 34 follows the design of the reflector 7 and extended part 8, as does also the pair of deflectors 35 and 36, positioned opposite the extended arm 34 and in the extreme corner thereof respectively, correspond with the pair of deflectors 15 and 16. The glass carrying frame 37, the main glass 38 and the auxiliary lens or glass 39 are identical with the parts 11, 12 and 13. There is this difference, however, that in the back part of the deflector arm 34 there is an opening 40 in alignment with the lens 39 and directly behind this an electric bulb 41 is positioned that is illuminated from a desirable source, not shown, the same as the main bulb 42 but capable of control independent of the latter. A rearwardly facing glass 43 is provided in an opening in the casing extension 32 so that a beam from the light bulb 41 may project backwardly as well.

As the construction of my invention has thus been described in detail, it should suffice in conclusion to make but a brief reference to its use and modus operandi: When the lights of a motor vehicle equipped with my improved headlights are illuminated, the main beams of the headlights are thrown forwardly unimpaired in the usual way, but in addition, a small secondary light is shown on the outside of each light, being readily distinguishable therefrom. This location of the small light, always on the outside of the main beam will in time become a convention and understood by all and if one of the headlights burns out or otherwise fails to light, the position of the individual light that functions is apparent to approaching drivers due to the understanding that the little light is always to the outside of the big or main beam. The dependence of the auxiliary beam on the same bulb as throws the main beam renders the device positive and dependable.

If colored lights are employed, a red light could be placed alongside one of the main glasses and a green light on the opposite headlight or if the double form was used, the red glass would be positioned on each side of one of the headlights and a green glass on each side of the other one.

The added security enjoyed by using the preferred form shown in Figure 3, results from the fact that should the central bulb burn out the auxiliary or parking bulbs can be illuminated thus lighting up the headlamp so that its location is discernible, and casting a beam from the auxiliary glass thereof that is readily recognized; the convenience of this form for parking or when travelling in city streets, as it will light up the main headlight glasses dimly and throw a bright gleam from the small auxiliary glasses, will be apparent.

From the foregoing description taken in connection with the accompanying drawings, it will be manifest that a headlight is provided that will fulfill all the necessary requirements of such a device, but as minor changes could be made in the above described structure and many apparently different embodiments of my invention constructed within the scope of the appended claims without departing from the spirit or scope thereof, it is intended that all matters contained in the said accompanying specification and drawings shall be interpreted as illustrative and not in a limited sense.

Having thus described my invention what I claim as new and desire to secure by Letters Patent is:—

1. A headlight for motor vehicles including a lamp casing having a side extension communicating with the main portion thereof; a reflector within said casing and following the configuration thereof; a lamp within said reflector; a main glass for said casing arranged so that direct rays of light from the lamp and reflected rays of light pass through said main glass; a second glass for the extension of said casing and arranged in alignment with the main glass; co-operating light ray deflectors carried by the main portion and the extension of the reflector and arranged at angles to deflect light rays from the lamp to one another and direct said deflector rays through the second glass as a beam of light parallel with and to the side of the main beam directed through the main glass, direct from the lamp and the reflector; and means for retaining said glasses in position on said casing.

2. A headlight for motor vehicles including a casing having a laterally offset extension at the side thereof; a reflector within said casing and following the configuration thereof; a bulb within the main portion of said casing; a main glass for said casing and a separate glass in alignment therewith for the extension of the casing; a third glass in the rear of the casing extension opposite the said separate glass; the extension of the reflector having an opening therethrough between said separate glass and said third glass; and co-operating light ray deflectors within said reflector for deflecting light rays from the bulb within the main portion of the casing and reflector and directing said deflected rays through said separate glass as a beam of light parallel with the main beam directed through said main glass.

3. A headlight for motor vehicles including a casing and a main reflector therein and corresponding to the configuration of said casing; said casing and said main reflector having corresponding side extensions; a bulb within the main portion of said reflector; main and auxiliary glasses carried by said casing; the direct rays of light from said bulb and reflected rays of light being directed through one of said glasses in a main light beam; and co-operating light ray deflectors within said reflector to deflect rays of light from said bulb and from said reflector and direct such deflected rays of light through one of said glasses as a separate beam of light parallel with said main beam of light.

In testimony whereof I hereunto affix my signature.

ANNA L. JAMIESON. [L. S.]